United States Patent
Huang

(10) Patent No.: US 10,203,886 B2
(45) Date of Patent: Feb. 12, 2019

(54) DATA WRITING METHOD, MEMORY CONTROL CIRCUIT UNIT AND MEMORY STORAGE APPARATUS FOR WRITING DATA FROM BUFFER MEMORY AND MOVING VALID DATA

(71) Applicant: PHISON ELECTRONICS CORP., Miaoli (TW)

(72) Inventor: Jia-Yan Huang, Taoyuan (TW)

(73) Assignee: PHISON ELECTRONICS CORP., Miaoli (TW)

( * ) Notice: Subject to any disclaimer, the term of this patent is extended or adjusted under 35 U.S.C. 154(b) by 314 days.

(21) Appl. No.: 15/080,557

(22) Filed: Mar. 24, 2016

(65) Prior Publication Data

US 2017/0228171 A1  Aug. 10, 2017

(30) Foreign Application Priority Data

Feb. 5, 2016  (TW) .............................. 105103995 A

(51) Int. Cl.
  *G06F 12/00*  (2006.01)
  *G06F 3/06*  (2006.01)

(52) U.S. Cl.
  CPC .......... *G06F 3/0616* (2013.01); *G06F 3/0652* (2013.01); *G06F 3/0656* (2013.01); *G06F 3/0679* (2013.01); *G06F 3/0659* (2013.01)

(58) Field of Classification Search
  None
  See application file for complete search history.

(56) References Cited

U.S. PATENT DOCUMENTS

| | | |
|---|---|---|
| 2012/0284587 A1 | 11/2012 | Yu et al. |
| 2014/0059271 A1 | 2/2014 | Meir et al. |
| 2016/0266826 A1* | 9/2016 | Ooneda ................ G11C 29/789 |
| 2017/0177235 A1* | 6/2017 | Nishikubo ............ G06F 3/0605 |
| 2017/0177469 A1* | 6/2017 | Hashimoto .......... G06F 12/0246 |

OTHER PUBLICATIONS

"Office Action of Taiwan Counterpart Application", dated Jul. 11, 2017, p. 1-p. 6.

\* cited by examiner

*Primary Examiner* — Reginald G Bragdon
*Assistant Examiner* — Michael L Westbrook
(74) *Attorney, Agent, or Firm* — JCIPRNET

(57) ABSTRACT

A data writing method, a memory control circuit unit and a memory storage apparatus are provided. The method includes: determining whether receiving a predetermined command from a host system. The method also includes: if receiving the predetermined command from the host system, writing at least one buffer data from a buffer memory into a first physical erasing unit, selecting at least one second physical erasing unit from the physical erasing units, and writing at least one valid data of the at least one second physical erasing unit into the first physical erasing unit in response to the predetermined command.

15 Claims, 10 Drawing Sheets

| Lower physical programming unit | Center physical programming unit | Upper physical programming unit |
|---|---|---|
| 0 | 1 | 2 |
| 3 | 4 | 5 |
| 6 | 7 | 8 |
| 9 | 10 | 11 |
| 12 | 13 | 14 |
| ⋮ | ⋮ | ⋮ |
| 255 | 256 | 257 |

DATA WRITING METHOD, MEMORY CONTROL CIRCUIT UNIT AND MEMORY STORAGE APPARATUS FOR WRITING DATA FROM BUFFER MEMORY AND MOVING VALID DATA

CROSS-REFERENCE TO RELATED APPLICATION

This application claims the priority benefit of Taiwan application serial no. 105103995, filed on Feb. 5, 2016. The entirety of the above-mentioned patent application is hereby incorporated by reference herein and made a part of this specification.

BACKGROUND

1. Technology Field

The present invention generally relates to a data writing method for a rewritable non-volatile memory, and a memory control circuit unit and a memory storage apparatus using the same.

2. Description of Related Art

Along with the widespread of digital cameras, cell phones, and MP3 players in recently years, the consumers' demand to storage media has increased drastically. Because a rewritable non-volatile memory is capable of providing features such as data non-volatility, low power consumption, small volume, and non-mechanical structure, high reading and writing speed, the rewritable non-volatile memory has become the most adaptable memory applied in a portable electronic product, e.g., a notebook computer. A solid state drive (SSD) is a storage apparatus which utilizes a flash memory as its storage medium. Therefore, the flash memory industry has become a very popular part of the electronic industry in recent years.

In an NAND flash memory module, a physical programming unit is composed of a plurality of memory cells arranged on the same word line. According to the number of bits which can be stored by each memory cell, NAND flash memory modules can be classified into a single level cell (SLC) NAND flash memory module, a multi level cell (MLC) NAND flash memory module and a trinary level cell (TLC) NAND flash memory module. Each memory cell in the SLC NAND flash memory module can store data of 1 bit (i.e., "1" or "0"), each memory cell in the MLC NAND flash memory module can store data of 2 bits, and each memory cell in the TLC NAND flash memory module can store data of 3 bits.

Since each memory cell in the SLC NAND flash memory can store data of 1 bit, in the SLC NAND flash memory module, the memory cells arranged on the same word line are corresponding to a physical programming unit.

In comparison with the SLC NAND flash memory module, a floating gate storage layer in each memory cell of the MLC NAND flash memory module can store data of 2 bits, and each storage state (i.e., "11," "10," "01," or "00") includes the least significant bit (LSB) and the most significant bit (MSB). For instance, a value of the first bit from the left of the storage states is the LSB, and a value of the second bit from the left of the storage states is the MSB. Accordingly, the memory cells arranged on the same word line may constitute two physical programming units, wherein the physical programming unit constituted by the LSB of the memory cells is referred to as a lower physical programming unit, and the physical programming unit constituted by the MSB of the memory cells is referred to as an upper physical programming unit. Specifically, when an error occurs during the upper physical programming units being programmed, data stored by the lower physical programming unit may be therefore lost.

Similarly, each memory cell in the TLC NAND flash memory can store data of 3 bits, and each storage state (i.e., "111," "110," "101," "100," "011," "010," "001," or "000") includes an LSB which is the first bit from the left of the storage states, a center significant bit (CSB) which is the second bit from the left of the storage states and an MSB which is the third bit from the left of the storage states. Accordingly, the memory cells arranged on the same word line may constitute three physical programming units, wherein the physical programming unit constituted by the LSB of the memory cells is referred to as a lower physical programming unit, the physical programming unit constituted by the CSB of the memory cells is referred to as a center physical programming unit, and the physical programming unit constituted by the MSB of the memory cells is referred to as a upper physical programming unit. Specifically, in the TLC NAND flash memory module, a word line has to be programmed for three times to ensure that the data on the word line can be stably stored. For instance, after memory cells on a first word line are programmed for the first time, the memory cells on the first word line are in a first state. The memory cells on the first word line are programmed again while the memory cells on a second word lines are programmed, and in this circumstance, the memory cells on the first word line are in a foggy state. Then, the memory cells on the first and the second word lines are programmed again while the memory cells on a third word line are programmed, and in this circumstance, the memory cells on the first word line are in a fine state. Further, the memory cells on the second and the third word lines are programmed again while the memory cells on a fourth word line, and in this circumstance, the memory cells on the second word line are in the fine state. Thereby, the data in the memory cells on the first word line can be ensured to be stably stored.

In a case, if a host system issues a suspend command to turn off the host system, the host system subsequently issues a flush command to write buffer data temporarily stored in a buffer memory into a flash memory to prevent the buffer data from being lost after the power is off. Based on the aforementioned hardware limitations to the TLC NAND flash memory module, in order to ensure that the buffer data is stably stored from the buffer memory in the TLC NAND flash memory module, a memory control circuit unit continues to program the other three word lines using dummy data after the buffer data is written from the buffer memory into an operating physical erasing unit of the TLC NAND flash memory module. Thereby, the buffer data from the buffer memory being stably stored into the TLC NAND flash memory module can be ensured. However, the numbers of writing or erasing the flash memory module are limited, and writing invalid data would lead the lifespan of the TLC NAND flash memory module to be shortened.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

Accordingly, the present invention is directed to a data writing method, a memory control circuit unit and a memory storage apparatus capable of writing data from a buffer memory into a rewritable non-volatile memory module and moving valid data if a host system issues a predetermined command, thereby preventing storing invalid data and extending the lifespan of the rewritable non-volatile memory module.

According to an exemplary embodiment, a data writing method for a rewritable non-volatile memory module of a memory storage apparatus is provided. The memory storage apparatus has a buffer memory, the rewritable non-volatile memory module has a plurality of physical erasing units, and each of the physical erasing units has a plurality of physical programming units. The method includes: determining whether a predetermined command is received from a host system. The method also includes: if the predetermined command is received from the host system, writing buffer data from the buffer memory into a first physical erasing unit among the physical erasing units, and selecting at least one second physical erasing unit from the physical erasing units. The method further includes: writing valid data of the at least one second physical erasing unit into the first physical erasing unit.

According to an exemplary embodiment, a memory control circuit unit of controlling a rewritable non-volatile memory module is provided. The memory control circuit unit includes: a host interface, a memory interface, a buffer memory and a memory management circuit. The host interface is configured to be coupled to a host system. The memory interface is configured to be coupled to the rewritable non-volatile memory module. The rewritable non-volatile memory module has a plurality of physical erasing units, and each of the physical erasing units has a plurality of physical programming units. The buffer memory is coupled to the host interface and the memory interface. The buffer memory is configured to store buffer data. The memory management circuit is coupled to the host interface, the memory interface and the buffer memory. The memory management circuit is configured to determining whether a predetermined command is received from the host system. If the predetermined command is received from the host system, the memory management circuit is further configured to issue a first command sequence to write the buffer data from the buffer memory into a first physical erasing unit among the physical erasing units and select at least one second physical erasing unit from the physical erasing units. The memory management circuit is further configured to issue a second command sequence to write valid data of the second physical erasing unit into the first physical erasing unit.

According to an exemplary embodiment, a memory storage apparatus is provided. The memory storage apparatus includes: a connection interface unit, a rewritable non-volatile memory module and a memory control circuit unit. The connection interface unit is configured to be coupled to a host system. The memory control circuit unit is coupled to the connection interface unit and the rewritable non-volatile memory module. The rewritable non-volatile memory module has a plurality of physical erasing units, and each of the physical erasing units has a plurality of physical programming units. The memory control circuit unit includes a buffer memory. The buffer memory is configured to store buffer data. The memory control circuit unit is configured to determining whether a predetermined command is received from the host system. If the predetermined command is received from the host system, the memory control circuit unit is further configured to issue a first command sequence to write the buffer data from the buffer memory into a first physical erasing unit among the physical erasing units and select at least one second physical erasing unit from the physical erasing units. The memory control circuit unit is further configured to issue a second command sequence to write valid data of the at least one second physical erasing unit into the first physical erasing unit.

To sum up, in the data writing method of the present invention, if the predetermined command issued by the host system is received, the buffer data is stored from the buffer memory to the physical erasing unit in the rewritable non-volatile memory module, and the valid data of other physical erasing units is written into the physical erasing unit. Thereby, the use efficiency of the rewritable non-volatile memory module can be effectively improved, and the lifespan of the rewritable non-volatile memory module can be extended.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
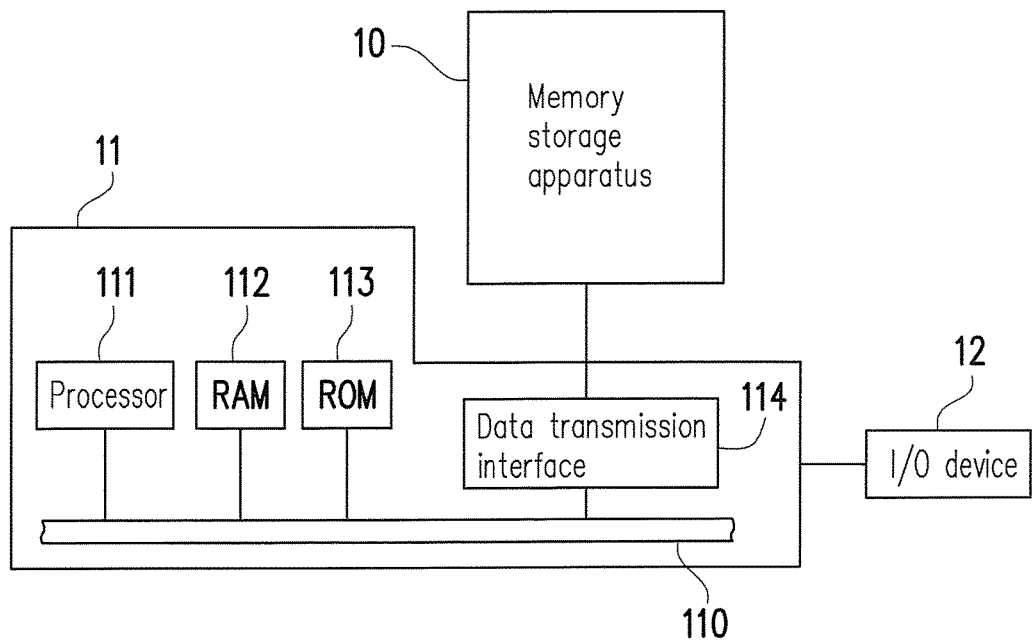
FIG. 1 is a schematic diagram illustrating a host system, a memory storage apparatus and an input/output (I/O) device according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally speaking, a memory storage apparatus i.e. a memory storage system) includes a rewritable non-volatile memory module and a controller (i.e. a control circuit unit). The memory storage apparatus is usually used together with a host system, such that the host system can write data into or read data from the memory storage apparatus.

Figure 2:
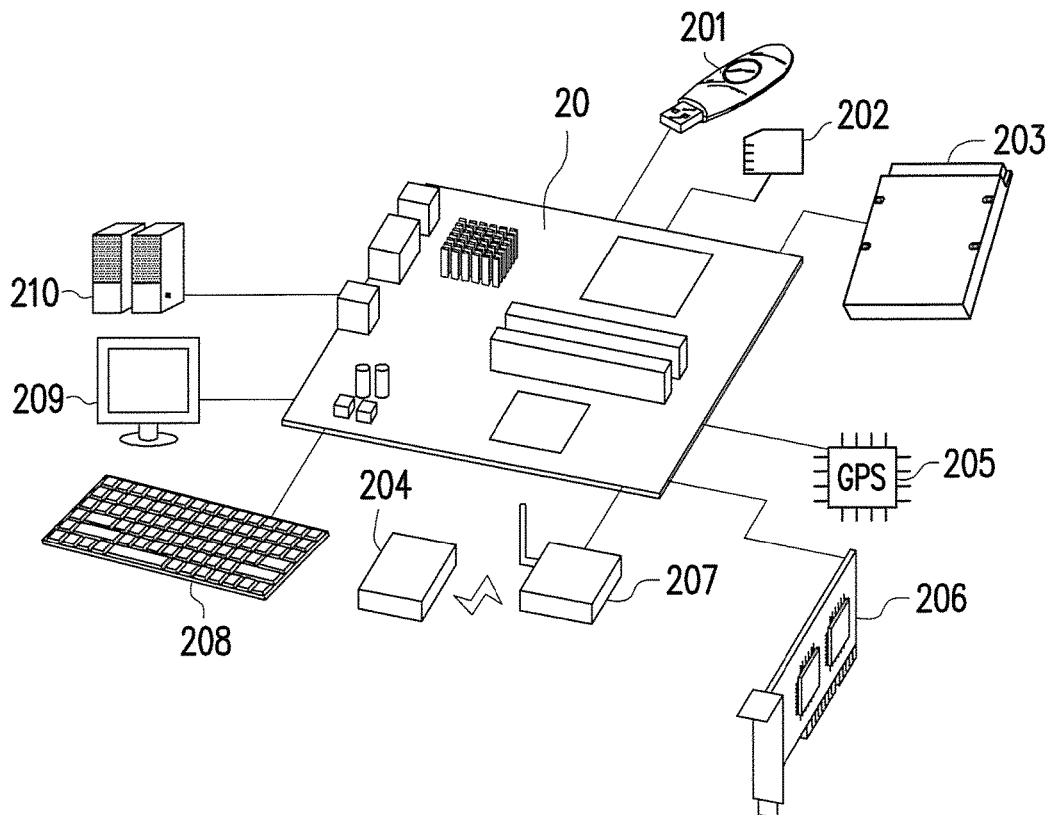
FIG. 2 is a schematic diagram illustrating a host system, a memory storage apparatus and an I/O device according to another exemplary embodiment.

FIG. 1 is a schematic diagram illustrating a host system and a memory storage apparatus and an input/output (I/O) device according to an exemplary embodiment, and FIG. 2 is a schematic diagram illustrating a host system, a memory storage apparatus and an I/O device according to another exemplary embodiment.

With reference to FIG. 1 and FIG. 2, a host system 11 typically includes a processor 111, a random access memory (RAM) 112, a read only memory (ROM) 113 and a data transmission interface 114. The processor 111, the RAM 112, the ROM 113 and the data transmission interface 114 are coupled to the system bus 110.

In the present exemplary embodiment, the host system 11 is coupled to the memory storage apparatus 10 through the data transmission interface 114. For example, the host system 11 may write data into the memory storage apparatus 10 or read data from the memory storage apparatus 10 through the data transmission interface 114. Additionally, the host system 11 is coupled to the I/O device 12 through the system bus 110. For example, the host system 11 may transmit a signal to the I/O device 12 or receive a signal from the I/O device 12 through the system bus 110.

In the present exemplary embodiment, the processor 111, the RAM 112, the ROM 113 and the data transmission interface 114 are disposed on a motherboard 20 of the host system 11. The number of the data transmission interface 114 may be one or plural. The motherboard 20 is coupled to the memory storage apparatus 10 in a wired or a wireless manner through the data transmission interface 114. The memory storage apparatus 10 is, for example, a flash drive 201, a memory card 202, a solid state drive (SSD) 203 or a wireless memory storage apparatus 204. The wireless memory storage apparatus 204 is, for example, a memory storage apparatus based on a wireless communication technique, such as a near field communication storage (NFC) memory storage apparatus, a wireless fidelity (Wi-Fi) memory storage apparatus, a Bluetooth memory storage apparatus or a Bluetooth low energy memory storage apparatus (e.g., iBeacon). Moreover, the motherboard 20 can also be coupled to various I/O devices, such as a global positioning system (GPS) module 205, a network interface card 206, a wireless transmission device 207, a keyboard 208, a screen 209, a loudspeaker 210, etc., through the system bus 110. For example, in an exemplary embodiment, the motherboard 20 may access the wireless memory storage apparatus 204 through the wireless transmission device 207.

Figure 3:
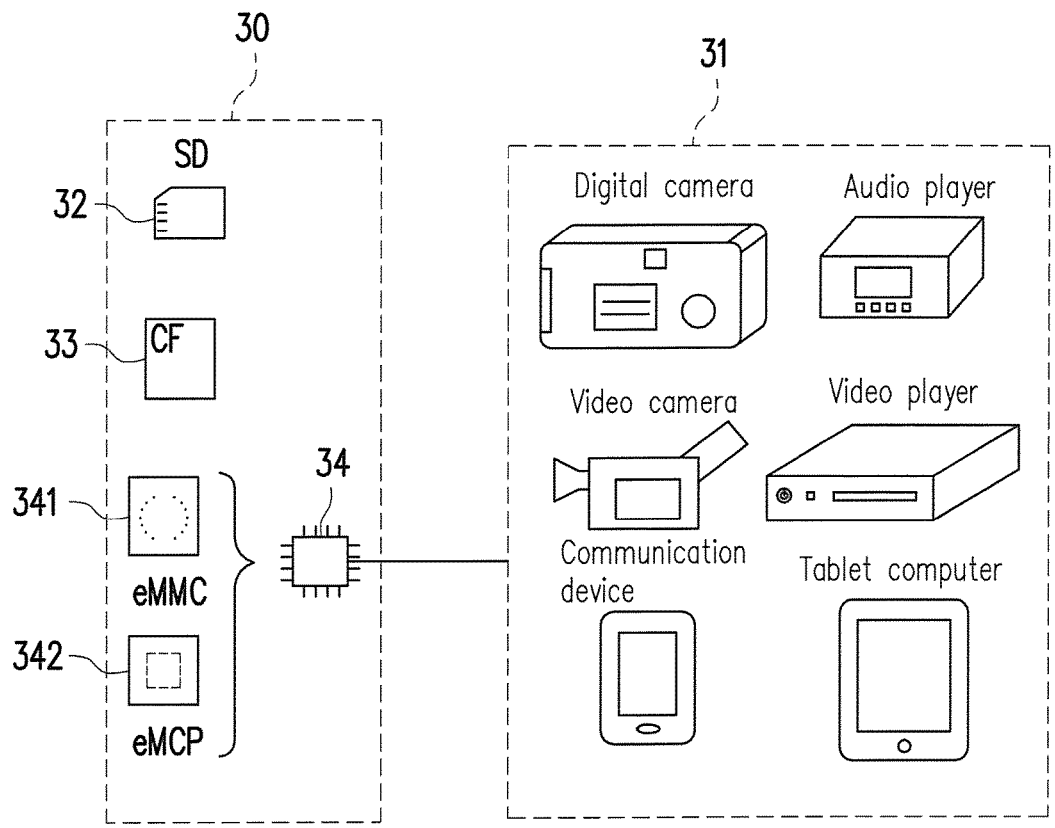
FIG. 3 is a schematic diagram illustrating a host system and a memory storage apparatus according to an exemplary embodiment.

In an exemplary embodiment, the aforementioned host system may be any system substantially cooperated with the memory storage apparatus to store data. Even though the host system implemented by a computer system is taken as an example for description in the exemplary embodiment above, FIG. 3 is a schematic diagram illustrating a host system and a memory storage apparatus according to another exemplary embodiment of the present invention. With reference to FIG. 3, in another exemplary embodiment, a host system 31 may also be a digital camera, a video camera, a communication device, an audio player, a video player or a tablet PC, etc., and the memory storage apparatus 30 may be a memory storage apparatus, such as a secure digital (SD) card 32, a compact flash (CF) card 33, or an embedded storage apparatus 34, etc., used by the host system 31. The embedded storage apparatus 34 includes an embedded multimedia card (eMMC) 341 and/or an embedded multi chip package (eMCP) storage apparatus 342, etc., that is formed by directly coupling various memory modules to a substrate of the host system.

Figure 4:
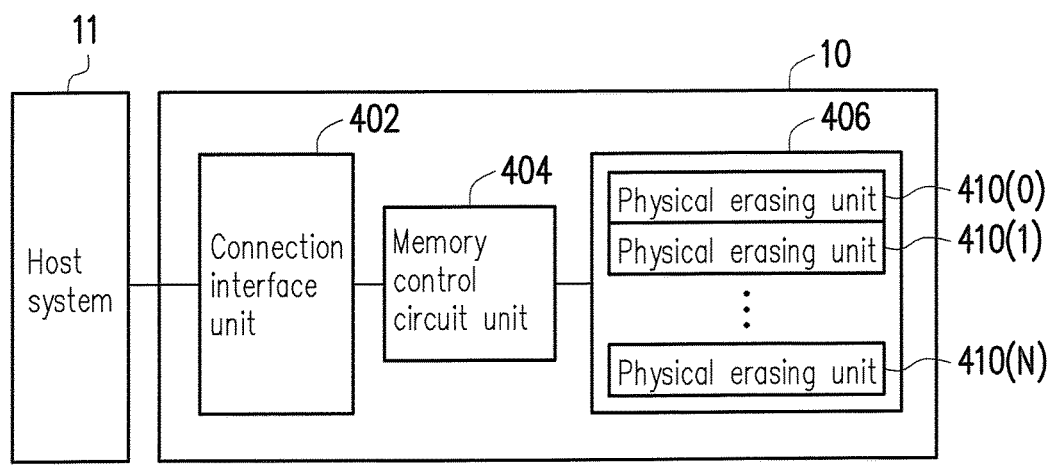
FIG. 4 is a schematic block diagram illustrating the host system and the memory storage apparatus according to an exemplary embodiment.

FIG. 4 is a schematic block diagram illustrating the host system and the memory storage apparatus according to an exemplary embodiment.

With reference to FIG. 4, the memory storage apparatus 10 includes a connection interface unit 402, a memory control circuit unit 404 and a rewritable non-volatile memory module 406.

In the present exemplary embodiment, the connection interface unit 402 complies with a serial advanced technology attachment (SATA) standard. However, it should be noted that the present invention is not limited thereto, and the connection interface unit 402 may also comply with a parallel advanced technology attachment (PATA) standard, an institute of electrical and electronic engineers (IEEE) 1394 standard, a peripheral component interconnect (PCI) express standard, a universal serial bus (USB) standard, an ultra high speed-I (UHS-I) interface standard, an ultra high speed-II (UHS-II) interface standard, a secure digital (SD) interface standard, a memory stick (MS) interface standard, a multi-chip package interface standard, a multimedia card (MMC) interface standard, an embedded multimedia card (eMMC) interface standard, a universal flash storage (UFS) interface standard, an embedded multi chip package (eMCP) interface standard, a compact flash (CF) interface standard, an integrated device electronics (IDE) standard or other suitable standards. In the present exemplary embodiment, the connection interface unit 402 and the memory control circuit unit 404 may be packaged in a chip, or the connection interface unit 402 is configured outside a chip containing the memory control circuit unit.

The memory control circuit unit 404 is configured to execute a plurality of logic gates or control instructions implemented in a hardware form or a firmware form and perform operations, such as data writing, data reading and data erasing, in the rewritable non-volatile memory module 406 according to commands of the host system 11.

The rewritable non-volatile memory module 406 is coupled to the memory control circuit unit 404 and configured to store data written by the host system 11. The rewritable non-volatile memory module 406 has physical erasing units 410(0) to 410(N). For example, the physical erasing units 410(0) to 410(N) may belong to the same memory die or different memory dies. Each physical erasing unit has a plurality of physical programming units, where the physical programming units belonging to the same physical erasing unit may be separately written, but simultaneously erased altogether. However, it should be understood that the present invention is not limited thereto, and each physical erasing unit may be composed of 64 physical programming units, 256 physical programming units or any other number of physical programming units.

To be more detailed, a physical erasing unit is the smallest unit for erasing data. Namely, each physical erasing unit contains the least number of memory cells to be erased altogether. A physical programming unit is the smallest unit for programming data. Namely, the physical programming unit is the smallest unit for writing data. Each physical programming unit usually includes a data bit area and a redundant bit area. The data bit area includes a plurality of physical access addresses for storing data of a user, and the redundant bit area is configured for storing system data (e.g., control information and error correcting codes). In the present exemplary embodiment, the data bit area of each physical programming unit contains 8 physical access addresses, and the size of each physical access addresses is 512 bytes. However, in other exemplary embodiments, the data bit area may also contain more or less number of physical access addresses, and the size and the number of the physical access addresses are not particularly limited in the present invention. For example, in an exemplary embodiment, a physical erasing unit is a physical block, and a physical programming unit is a physical page or a physical sector, but the present invention is not limited thereto.

In the present exemplary embodiment, the rewritable non-volatile memory module 406 is a trinary-level cell (TLC) NAND flash memory module (i.e., a flash memory module in which a memory cell is capable of storing data of 3 bits). However, the present invention is not limited thereto, and the rewritable non-volatile memory module 406 may also be a multi level cell (MLC) NAND flash memory module (i.e., a flash memory module in which a memory cell is capable of storing data of 2 bits), or other memory modules having the same characteristics.

Figures 5A, 5B:
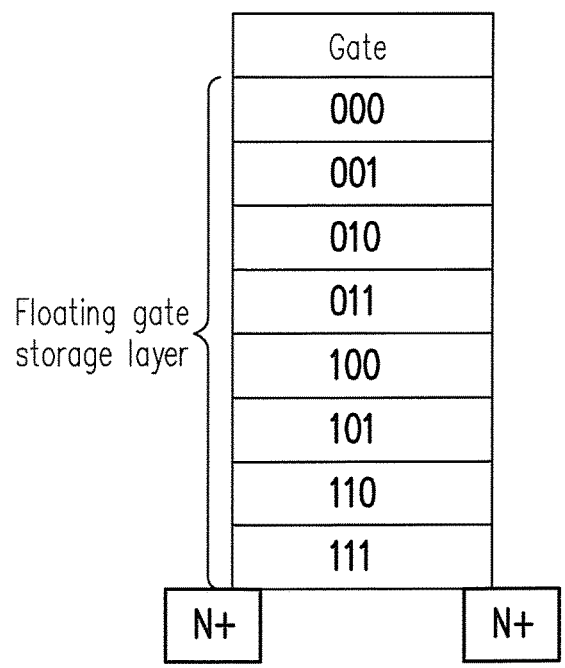
FIG. 5A and FIG. 5B are schematic diagrams illustrating a storage structure of memory cells and physical erasing units according to an exemplary embodiment.

FIG. 5A and FIG. 5B are schematic diagrams illustrating a storage structure of memory cells and physical erasing units according to an exemplary embodiment.

With reference to FIG. 5A, a storage state of each memory cell of the rewritable non-volatile memory module 406 may be identified as "111", "110", "101", "100", "011", "010", "001" or "000" (as illustrated in FIG. 5A), where a first bit from the left is the least significant bit (LSB), a second bit from the left is the center significant bit (CSB) and a third bit from the left is the most significant bit (MSB). Moreover, a plurality of memory cells arranged on the same word line may form 3 physical programming units, where the physical programming unit formed by the LSBs of the memory cells is referred to as a lower physical programming unit, the physical programming unit formed by the CSBs of the memory cells is referred to as a center physical programming unit, and the physical programming unit formed by the MSBs of the memory cells is referred to as an upper physical programming unit.

With reference to FIG. 5B, a physical erasing unit is composed of a plurality of physical programming units, in which the physical programming units include lower physical programming units, center physical programming units and upper physical programming units formed by a plurality of memory cells arranged on the same word line. For example, in the physical erasing unit, a $0^{th}$ physical programming unit belonging to the lower physical programming unit, a $1^{st}$ physical programming unit belonging to the center physical programming unit and a $2^{nd}$ physical programming unit belonging to the upper physical programming unit are considered as a physical programming unit set. Similarly, a $3^{rd}$, a $4^{th}$, and a $5^{th}$ physical programming units are considered as a physical programming unit set, and deduced by analogy, the other physical programming units are grouped into a plurality of physical programming unit sets in the same way. That is, in the exemplary embodiment illustrated in FIG. 5B, the physical erasing unit has 258 physical programming units in total, and since lower the physical programming unit, the center physical programming unit and the upper physical programming unit formed by the plurality of memory cells arranged on the same word line constitute a physical programming unit set, the physical erasing unit illustrated in FIG. 5B may be divided into 86 physical programming unit sets. However, it should be noted that the present invention is not intent to limit the number of the number of the physical programming units in the physical erasing unit or the number of the physical programming unit sets.

Figure 6:
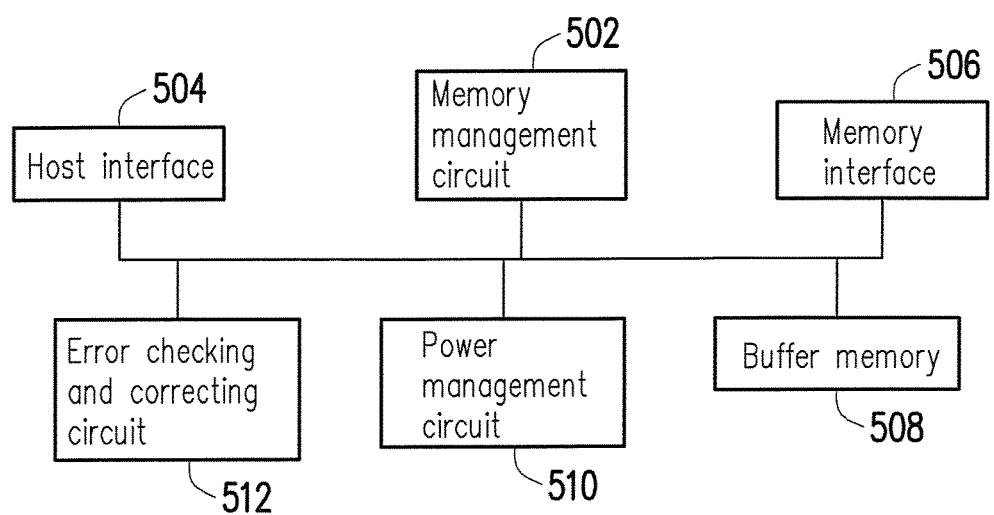
FIG. 6 is a schematic block diagram illustrating the memory control circuit unit according to an exemplary embodiment.

FIG. 6 is a schematic block diagram illustrating the memory control circuit unit according to an exemplary embodiment.

With reference to FIG. 6, the memory control circuit unit 404 includes a memory management circuit 502, a host interface 504, a memory interface 506, a buffer memory 508, a power management circuit 510 and an error checking and correcting circuit 512.

The memory management circuit 502 is configured to control overall operation of the memory control circuit unit 404. Specifically, the memory management circuit 502 has a plurality of control instructions, and when the memory storage apparatus 10 is in operation, the control instructions are executed to perform operations, such as data writing, data reading, and data erasing.

In the present exemplary embodiment, the control instructions of the memory management circuit 502 are implemented in a firmware form. For example, the memory management circuit 502 has a microprocessor unit (not shown) and a read-only memory (ROM, not shown), and the control instructions are burnt in the ROM. When the memory storage apparatus 10 is in operation, the control instructions are executed by the microprocessor unit to perform the operations, such as data writing, data reading and data erasing.

Figure 7:
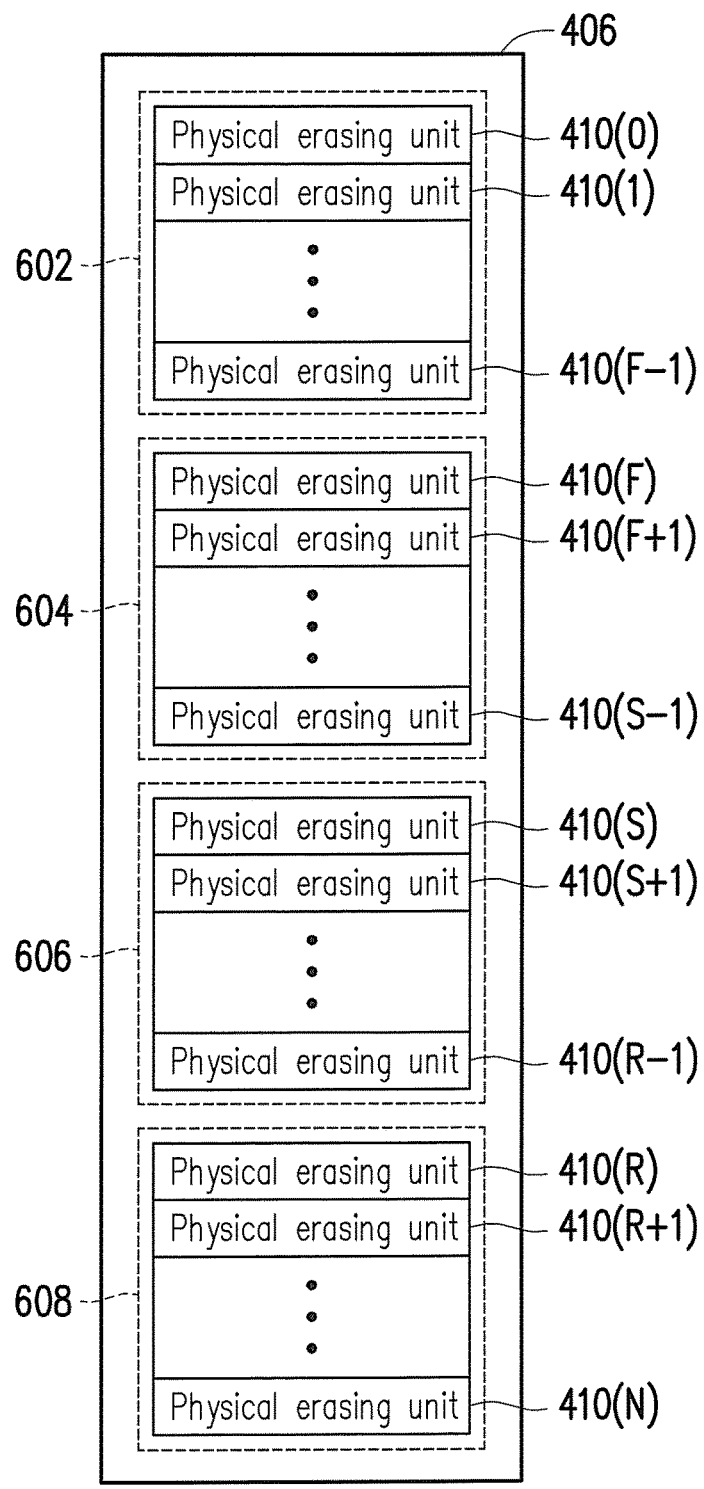
FIG. 7 and FIG. 8 are schematic diagrams illustrating examples of the management of the physical erasing units according to an exemplary embodiment.
Figure 8:
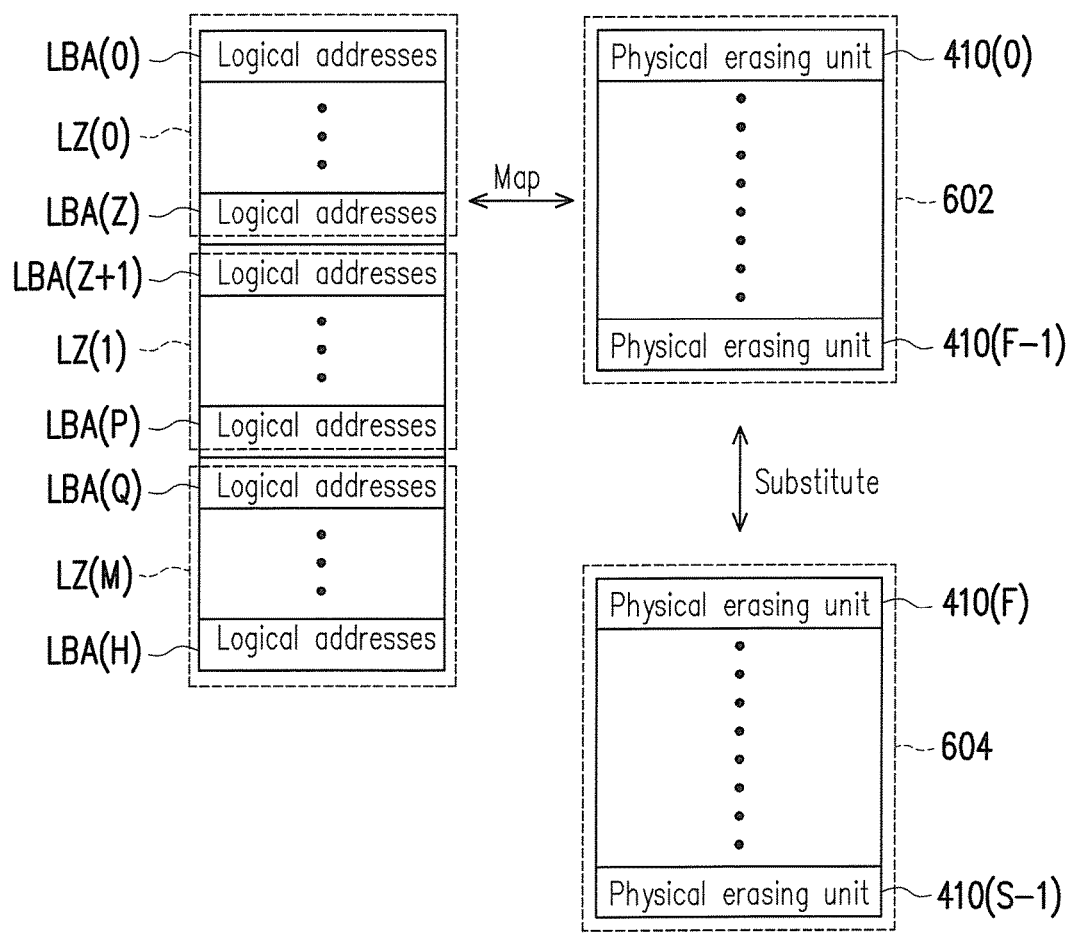

FIG. 7 and FIG. 8 are schematic diagrams illustrating examples of the management of the physical erasing units according to an exemplary embodiment.

It should be understood that in description of the operations of the physical erasing units of the rewritable non-volatile memory module 406, the terms "get", "select", "group", "divide", "associate" and so on used for the physical erasing units are logical concepts. Namely, the physical erasing units of the rewritable non-volatile memory module are operated logically, while actual locations of the physical erasing units of the rewritable non-volatile memory module 406 are not changed.

With reference to FIG. 7, the memory control circuit unit 404 (or the memory management circuit 502) logically groups the physical erasing units 410(0) to 410(N) into a data area 602, a spare area 604, a system area 606 and a replacement area 608.

The physical erasing units logically belonging to the data area 602 and the spare area 604 are configured to store data from the host system 11. Specifically, the physical erasing units belonging to the data area 602 are considered as physical erasing units with data stored therein, and the physical erasing units belonging to the spare area 604 are used to replace the physical erasing units of the data area 602. In other words, when receiving a write command and data to be written from the host system 11, the memory management circuit 502 selects a physical erasing unit from the spare area 604 and writes the data into the selected physical erasing unit to replace the physical erasing unit in the data area 602.

The physical erasing units logically belonging to the system area 606 are configured to record system data. For example, the system data includes a manufacturer and a model with respect to the rewritable non-volatile memory module, the number of the physical erasing units in the rewritable non-volatile memory module, and the number of the physical programming units of each physical erasing unit.

The physical erasing units logically belonging to the replacement area 608 are used for a bad physical erasing unit replacement procedure to replace damaged physical erasing units. Specifically, if there are normal physical erasing units in the replacement area 608, and a physical erasing unit in the data area 602 is damaged, the memory management circuit 502 selects a normal physical erasing unit from the replacement area 608 to replace the damaged physical erasing units.

Specially, the number of the physical erasing units belonging to the data area 602, the spare area 604, the system area 606 and the replacement area 608 vary with different memory types. Additionally, it should be understood that in the operation of the memory storage apparatus 10, a grouping relationship of associating the physical erasing units with the data area 602, the spare area 604, the system area 606 and the replacement area 608 is dynamically changed. For example, when a physical erasing unit in the spare area 604 is damaged and replaced by a physical erasing unit from the replacement area 608, the physical erasing unit previously in the replacement area 608 is associated with the spare area 604.

With reference to FIG. 8, the memory control circuit unit 404 (or the memory management circuit 502) configures logical addresses LBA(0) to LBA(H) for mapping the physical erasing units in the data area 602, where each logical address has a plurality of logical units which are mapped to the physical programming units of the corresponding physical erasing unit. Meanwhile, when the host system 11 is to write data into a logical address or to update data stored in the logical address, the memory control circuit unit 404 (or the memory management circuit 502) selects a physical erasing unit from the spare area 604 to serve as an operating physical erasing unit for writing the data to substitute for the physical erasing unit in the data area 602. And, when the physical erasing unit serving as the operating physical erasing unit is fully filled, the memory control circuit unit 404 (or the memory management circuit 502) further selects an empty physical erasing unit from the spare area 504 to serve as the operating physical erasing units to continue to write update data corresponding to the write command from the host system 1000. In addition, when the number of the available physical erasing units in the spare area 604 is less than a predetermined value, the memory control circuit unit 404 (or the memory management circuit 502) executes a valid data merging procedure (which is also referred to as a garbage collecting procedure) to reorganize the valid data of the data area 602 and accordingly, re-associates the physical erasing units in the data area 602 which do not store any valid data with the spare area 604.

In order to identify which physical erasing unit the data of each logical address is stored in, in the present exemplary embodiment, the memory control circuit unit 404 (or the memory management circuit 502) records a mapping relationship between the logical addresses and the physical erasing units. For example, in the present exemplary embodiment, the memory control circuit unit 404 (or the memory management circuit 502) stores a logical-physical address mapping table in the rewritable non-volatile memory module 406 to record the physical erasing unit that each logical address is mapped to. When intending to access data, the memory control circuit unit 404 (or the memory management circuit 502) loads the logical-physical address mapping table into the buffer memory 508 for maintaining and write or read data according to the logical-physical address mapping table.

It should be mentioned that the buffer memory 508 may be incapable of recording mapping tables recording the mapping relations of all logical addresses due to its limited capacity. Therefore, in the present exemplary embodiment, the memory control circuit unit 404 (or the memory management circuit 502) groups the logical addresses LBA(0) to LBA(H) into a plurality of logical zones LZ(0) to LZ(M) and assigns one logical address mapping table for each logical zone. Specially, when the memory control circuit unit 404 (or the memory management circuit 502) is to update the mapping with respect to a certain logical address, the logical-physical address mapping table of the logical zone corresponding to the logical address is loaded into the buffer memory 508 and is then updated.

In another exemplary embodiment of the present invention, the control instructions of the memory management circuit 502 are stored as program codes in a specific area (e.g. a system area in a memory module exclusively used for storing system data) of the rewritable non-volatile memory module 406. Additionally, the memory management circuit 502 has a microprocessor unit (not shown), a read-only memory (ROM, not shown) and a random access memory (RAM, not shown). In particular, the ROM has a boot code, and when the memory control circuit unit 404 is enabled, the microprocessor unit first executes the boot code to load the control instructions from the rewritable non-volatile memory module 106 into the RAM of the memory management circuit 502. The microprocessor unit then executes the control instructions to perform the operation, such as data writing, data reading and data erasing.

Furthermore, in another exemplary embodiment of the present invention, the control instructions of the memory management circuit 502 may also be implemented in a hardware form. For example, the memory management circuit 502 includes a micro controller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the micro controller. The memory cell management circuit is configured to manage the physical erasing units of the rewritable non-volatile memory module 406, the memory writing circuit is configured to issue a write command to the rewritable non-volatile memory module 406 to write data into the rewritable non-volatile memory module 406, the memory reading circuit is configured to issue a read command to the rewritable non-volatile memory module 406 to read data from the rewritable non-volatile memory module 406, the memory erasing circuit is configured to issue an erase command to the rewritable non-volatile memory module 406 to erase data from the rewritable non-volatile memory module 406, and the data processing circuit is configured to process data to be written into the rewritable non-volatile memory module 406 or data read from the rewritable non-volatile memory module 406.

Referring to FIG. 6 again, the host interface 504 is coupled to the memory management circuit 502 and configured to be coupled to the connection interface unit 402 to receive and identify commands and data transmitted by the host system 11. That is, the commands and the data transmitted by the host system 11 are transmitted to the memory management circuit 502 through the host interface 504. In the present exemplary embodiment, the host interface 504 complies with the SATA standard. However, it should be understood that the present invention is not limited thereto, and the host interface 504 may also comply with the PATA standard, the IEEE 1394 standard, the PCI Express standard, the USB standard, the UHS-I interface standard, the UHS-II interface standard, the SD standard, the MS standard, the MMC standard, the CF standard, the IDE standard or other suitable data transmission standards.

The memory interface 506 is coupled to the memory management circuit 502 and configured to access the rewritable non-volatile memory module 406. That is, the data to be written into the rewritable non-volatile memory module 406 is converted to an acceptable format for the rewritable non-volatile memory module 406 through the memory interface 506.

The buffer memory 508 is coupled to the memory management circuit 502 and configured to temporarily store buffer data and commands from the host system 11 or data from the rewritable non-volatile memory module 406.

The power management circuit 510 is coupled to the memory management circuit 502 and configured to control the power of the memory storage apparatus 10.

The error checking and correcting circuit 512 is coupled to the memory management circuit 502 and configured to perform an error checking and correcting procedure to ensure data accuracy. Specifically, if the memory management circuit 502 receives a write command from the host system 11, the error checking and correcting circuit 512 generates an error checking and correcting code (ECC code) for data corresponding to the write command, and the memory management circuit 502 writes the data corresponding to the write command and the corresponding ECC code into the rewritable non-volatile memory module 406. Thereafter, when reading the data from the rewritable non-volatile memory module 406, the memory management circuit 502 also reads the ECC code corresponding to the data, and the error checking and correcting circuit 512 performs the error checking and correcting procedure on the read data according to the ECC code.

In the present exemplary embodiment, when the host system 11 issues a suspend command to turn off the host system 11, the host system 11 subsequently issues a flush command to write the buffer data temporarily stored in the buffer memory into the rewritable non-volatile memory module 406 to prevent the buffer data from being lost after the power is off. In another exemplary embodiment, when the host system 11 issues the suspend command to turn off the host system 11, the memory control circuit 404 (or the memory management circuit 502) automatically executes a flush operation to write the buffer data temporarily stored in the buffer memory into the rewritable non-volatile memory module 406. Then, the memory control circuit unit 404 (or the memory management circuit 502) determines whether a predetermined command is received from the host system 11. The predetermined command is, for example, the aforementioned flush command or suspend command. It is assumed that when the memory control circuit unit 404 (or the memory management circuit 502) receives the predetermined command from the host system 11, the memory control circuit unit 404 (or the memory management circuit 502) performs a data writing method of the present invention. Specifically, when the memory control circuit unit 404 (or the memory management circuit 502) receives the predetermined command from the host system 11, the memory control circuit unit 404 (or the memory management circuit 502) issues a command sequence to write the buffer data from the buffer memory 508 into an operating physical erasing unit (which is referred to as a first physical erasing unit hereinafter) among the physical erasing units 410(0) to 410(N) of the rewritable non-volatile memory module 406 to prevent the buffer data from being lost after the power is off. In the present exemplary embodiment, the memory control circuit unit 404 (or the memory management circuit 502) selects the first physical erasing unit from one of the physical erasing units 410(F) to 410(S−1) in the spare area 604.

It should be noted that after the memory control circuit unit 404 (or the memory management circuit 502) writes the buffer data from the buffer memory 508 into the first physical erasing unit, if the first physical erasing unit, in this circumstance, still has available storage spaces (i.e., the first physical erasing unit is not filled with the buffer data of the buffer memory 508, the memory control circuit unit 404 (or the memory management circuit 502) writes valid data from other physical erasing units of the rewritable non-volatile memory module 406 to the first physical erasing unit. For example, in the present exemplary embodiment, the memory control circuit unit 404 (or the memory management circuit 502) selects at least one physical erasing unit (which is referred to as at least one second physical erasing unit hereinafter) storing valid data from the physical erasing units 410(0) to 410(F−1) in the data area 602. Thereafter, the memory control circuit unit 404 (or the memory management circuit 502) issues a command sequence to write the valid data of the second physical erasing units into the first physical erasing unit and fills the available storage spaces of the first physical erasing unit with the valid data. Specially, if the valid data has been written from the second physical erasing units into the first physical erasing unit, the data in the second physical erasing unit becomes invalid data. Specially, as the data in the second physical erasing units becomes invalid data, the memory control circuit unit 404 (or the memory management circuit 502) performs an erasing operation on the second physical erasing units and groups the second physical erasing units into the spare area 602 to free available storage spaces in the rewritable non-volatile memory module 406.

It should be noted that in an exemplary embodiment of the present invention, the memory control circuit unit 404 (or the memory management circuit 502) may also determine whether a quantity of the buffer data is less than a predetermined threshold after the operation of writing the buffer data from the buffer memory 508 into the first physical erasing unit and before the operation of selecting the second physical erasing units. If the quantity of the buffer data is less than the predetermined threshold, the memory control circuit unit 404 (or the memory management circuit 502) issues a command sequence to write at least one dummy data into the first physical erasing unit. And, only if the quantity of the buffer data is not less than the predetermined threshold, the memory control circuit unit 404 (or the memory management circuit 502) performs the operation of selecting the second physical erasing units from the physical erasing units 410(0) to 410(N) and issuing the command sequence to write the valid data of the second physical erasing unit into the first physical erasing unit.

Figure 9A:
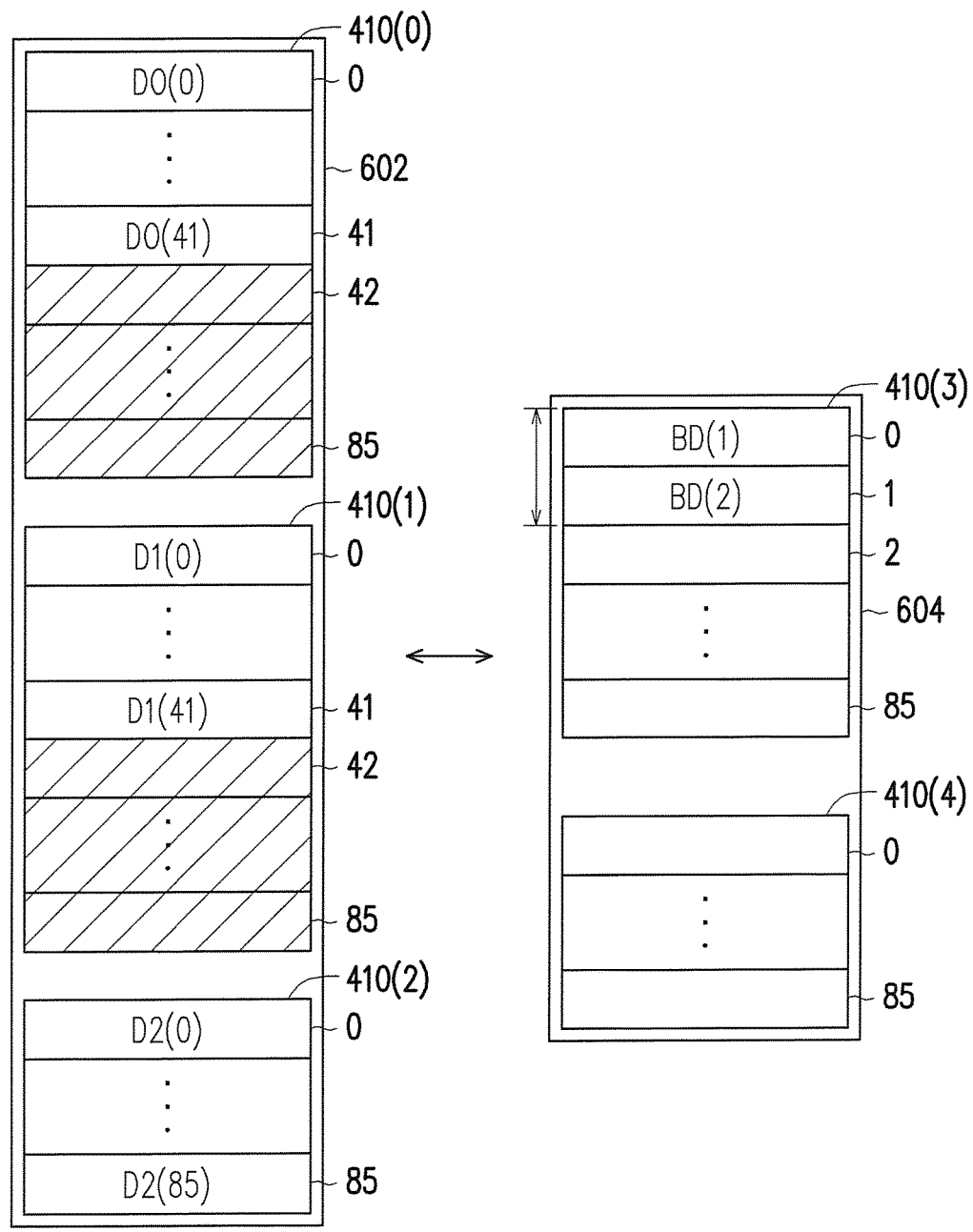
FIG. 9A to FIG. 9C are schematic diagrams illustrating examples of data writing according to an exemplary embodiment.
Figure 9B:
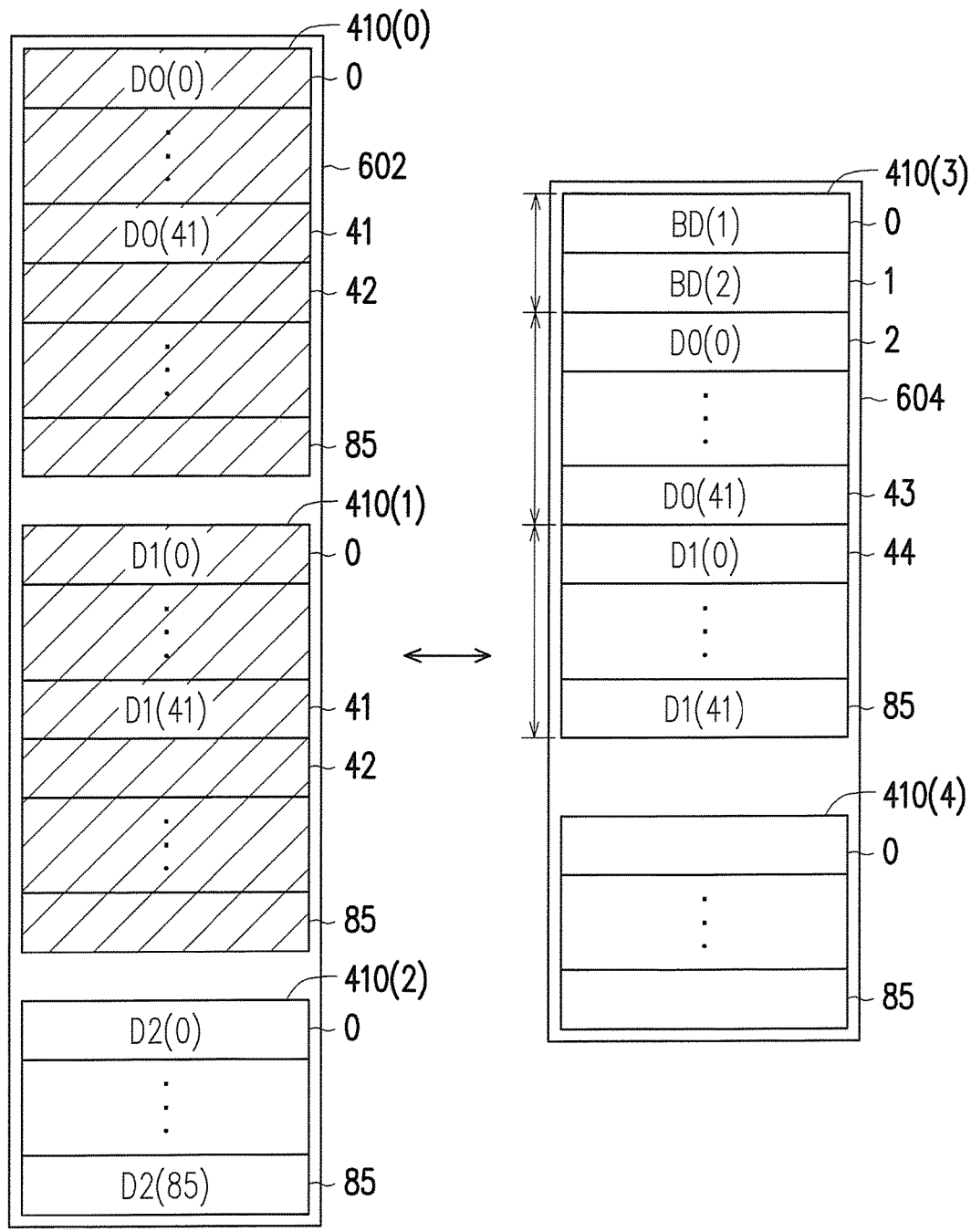
Figure 9C:
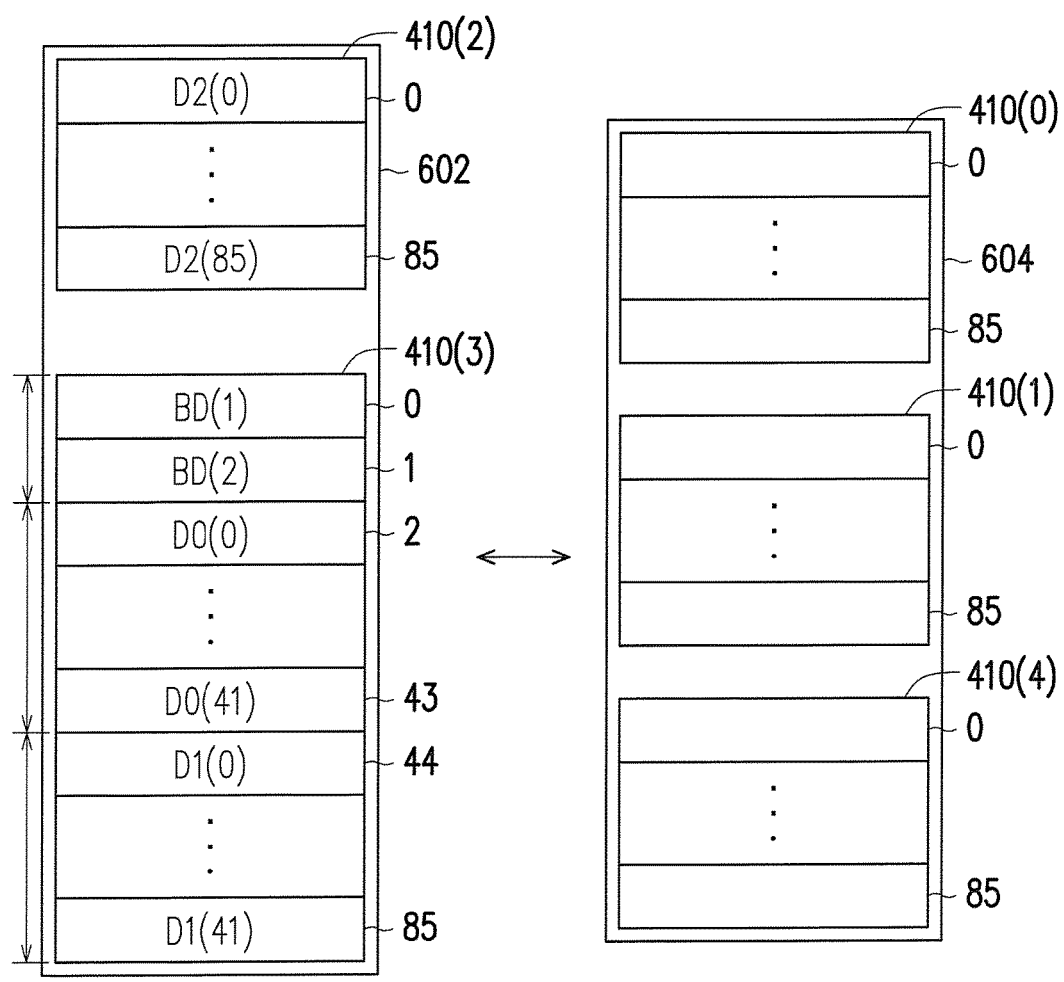

In order to better understand the data writing method of the present invention, FIG. 9A to FIG. 9C are schematic diagrams illustrating examples of data writing according to an exemplary embodiment.

For descriptive convenience, it is assumed that the data area 602 in the rewritable non-volatile memory module 406 has three physical erasing units, which are physical erasing units 410(0) to 410(2), respectively, and the spare area 604 has 2 physical erasing units, which are physical erasing units 410(3) to 410(4), respectively. Specially, in the exemplary embodiment illustrated in FIG. 9A to FIG. 9C, the rewritable non-volatile memory module 406 is a TLC NAND flash memory module, namely, the physical programming units belonging to each of the physical erasing units 410(0) to 410(4) include a plurality of lower physical programming units, a plurality of center physical programming units and a plurality of upper physical programming units. Based on the characteristics of the TLC NAND flash memory module that the memory cells on each word line have to be programmed for three times to ensure the data being stably stored in the memory cells, it is assumed that the data is written with a physical programming unit set as a unit in the examples illustrated in FIG. 9A to FIG. 9C, and each physical erasing unit has 86 physical programming unit set. The specific description related to the physical programming unit sets of the TLC NAND flash memory module has been set forth above with reference to the exemplary embodiment illustrated in FIG. 5A and FIG. 5B and thus, will not be repeated. However, it should be noted that the present invention is not limited thereto, in other exemplary embodiments, the data may be written with a physical programming unit as a unit or a smaller unit.

With reference to FIG. 9A, it is assumed that in the state of the memory storage apparatus 10 illustrated in FIG. 9A, a $0^{th}$ to a $41^{st}$ physical programming unit sets of the physical erasing unit 410(0) in the data area 602 respectively store valid data D0(0) to valid data D0(41), a $0^{th}$ to a $41^{st}$ physical programming unit sets of the physical erasing unit 410(1) respectively store valid data D1(0) to valid data D1(41), and a $0^{th}$ to a $85^{th}$ physical programming unit sets of the physical erasing unit 410(2) respectively store valid data D2(0) to valid data D2(85). Therein, data stored in a $42^{nd}$ to a $85^{th}$ physical programming unit sets of the physical erasing unit 410(0) and data stored in a $42^{nd}$ to a $85^{th}$ physical programming unit sets of the physical erasing unit 410(1) are respectively identifies as invalid data by the memory control circuit unit 404 (or the memory management circuit 502).

It is assumed that in the state illustrated in FIG. 9A, the host system 11 issues a suspend command to turn off the host system 11 and subsequently issues a flush command to write the buffer data temporarily stored in the buffer memory into the rewritable non-volatile memory module 406. In this case, after receiving the suspend command or the flush command issued by the host system 11, the memory control circuit unit 404 (or the memory management circuit 502) selects, for example, the physical erasing unit 410(3) (which is referred to as a first physical erasing unit hereinafter) from the spare area 604 and configures the physical erasing unit 410(3) to store the buffer data from the buffer memory 508. In the present exemplary embodiment, it is assumed that the buffer data in the buffer memory 508 is the buffer data BD(1) to the buffer data BD(2), respectively, and the memory control circuit unit 404 (or the memory management circuit 502) issues a command sequence to respectively write the buffer data BD(1) to the buffer data BD(2) from the buffer memory 508 into the $1^{st}$ to the $2^{nd}$ physical programming unit sets of the physical erasing unit 410(3).

It should be noted that in an exemplary embodiment of the invention, the memory control circuit unit 404 (or the memory management circuit 502) may further determine whether a quantity of the buffer data BD(1) to the buffer data BD(2) is less than the predetermined threshold after the operation of respectively writing the buffer data BD(1) to the buffer data BD(2) from the buffer memory 508 into the $1^{st}$ to the $2^{nd}$ physical programming unit sets of the physical erasing unit 410(3).

In an exemplary embodiment, the predetermined threshold may be set as 43, for example. If the quantity of the buffer data BD(1) to the buffer data BD(2) is less than the predetermined threshold, the memory control circuit unit 404 (or the memory management circuit 502) issues a command sequence to fill the available storage spaces of the physical erasing unit 410(3) remaining after the physical erasing unit 410(3) stores the buffer data BD(1) to the buffer data BD(2) with at least one dummy data. In another exemplary embodiment, based on the characteristics that the memory cells on each word line have to be programmed for three times to ensure the data being stably stored in the memory cells, if the quantity of the buffer data BD(1) to the buffer data BD(2) is less than the predetermined threshold, the memory control circuit unit 404 (or the memory management circuit 502) may also write part of the available storage space remaining after the physical erasing unit 410(3) stores the buffer data BD(1) to the buffer data BD(2) with at least one dummy data. The dummy data used to be written into the physical erasing unit 410(3) is in a quantity that can allow the buffer data BD(1) to the buffer data BD(2) to be stably stored in the physical erasing unit 410(3). That is, in the present exemplary embodiment, the dummy data to be written into the physical erasing unit 410(3) does not have to be fill the available storage spaces remaining after the physical erasing unit 410(3) stores the buffer data BD(1) to the buffer data BD(2), and the memory control circuit unit 404 (or the memory management circuit 502) may also write only a specific or a nonspecific quantity of dummy data as long as the buffer data BD(1) to the buffer data BD(2) can be stably stored in the physical erasing unit 410(3).

However, it should be understood that the present invention is not intent to limit the value of the predetermined threshold, and other exemplary embodiments, the predetermined threshold may also be other suitable values. Moreover, the present invention is not intent to limit the quantity of the dummy data to be written into the physical erasing unit 410(3).

In the present exemplary embodiment, referring to FIG. 9A to FIG. 9C, it is assumed that the predetermined threshold is set as 1. Since, in this case, the quantity of the buffer data BD(1) to the buffer data BD(2) is not less than the predetermined threshold, the memory control circuit unit 404 (or the memory management circuit 502) selects second physical erasing units from the physical erasing units 410(0) to 410(N) and issues a command sequence to write the valid data of the second physical erasing unit into the first physical erasing unit.

Specifically, since the available storage spaces of the physical erasing unit 410(3) are not yet filled with the buffer data BD(1) to the buffer data BD(2) from the buffer memory 508 (i.e., the physical erasing unit 410(3) still contains the $2^{nd}$ to the $85^{th}$ physical programming unit sets storing no data), the memory control circuit unit 404 (or the memory management circuit 502) selects the physical erasing unit 410(0) and the physical erasing unit 410(1) (which are referred to as second physical erasing units), for example, from the physical erasing units 410(0) to 410(2) in the data area 602 for performing a valid data merging procedure and issues a command sequence to respectively write the valid data of the physical erasing unit 410(0) and the physical erasing unit 410(1) into the physical erasing unit 410(3) fill the storage spaces of the physical erasing unit 410(3). In the present exemplary embodiment, the total quantity of the valid data of the physical erasing unit 410(0) and the physical erasing unit 410(1) selected by the memory control circuit unit 404 (or the memory management circuit 502) is just capable of filling the available storage spaces remaining after the physical erasing unit 410(3) stores the buffer data BD(1) to the buffer data BD(2) (i.e., the $2^{nd}$ to the $85^{th}$ physical programming unit sets in the physical erasing unit 410(3). However, it should be noted that in other exemplary embodiments, the total quantity of the valid data of the second physical erasing unit selected by the memory control circuit unit 404 (or the memory management circuit 502) may be more or less than the available storage spaces remaining after the first physical erasing unit stores the buffer data from the buffer memory. In this circumstance, the memory control circuit unit 404 (or the memory management circuit 502) may write only part of the valid data from the second physical erasing unit, such that the valid data may fill the available storage spaces of the first physical erasing unit.

Then, referring to both FIG. 9A and FIG. 9B simultaneously, the memory control circuit unit 404 (or the memory management circuit 502) respectively writes the valid data D0(0) to the valid data D0(41) of the physical erasing unit 410(0) into the $2^{nd}$ to $43^{rd}$ physical programming unit sets of the physical erasing unit 410(3) and respectively writes the valid data D1(0) to the valid data D1(41) of the physical erasing unit 410(1) into the $44^{th}$ to $85^{th}$ physical programming unit sets of the physical erasing unit 410(3) to fill the available storage spaces of the $2^{nd}$ to $85^{th}$ physical programming unit sets of the physical erasing unit 410(3).

Then, referring to both FIG. 9B and FIG. 9C simultaneously, in the present exemplary embodiment, the valid data of the physical erasing unit 410(0) and the physical erasing unit 410(1) are all written into the physical erasing unit 410(3), the memory control circuit unit 404 (or the memory management circuit 502) considers the data stored in the physical erasing unit 410(0) and the physical erasing unit 410(1) as invalid data, issues a command sequence to perform an erasing operation on the physical erasing unit 410(0) and the physical erasing unit 410(1) and associates the physical erasing unit 410(0) and the physical erasing unit 410(1) with the spare area 604 to free the storage spaces of the rewritable non-volatile memory module 406 and increase the number of spare physical erasing units in the spare area 604. Moreover, the memory control circuit unit 404 (or the memory management circuit 502) associates the physical erasing unit 410(3) with the data area 602.

Figure 10:
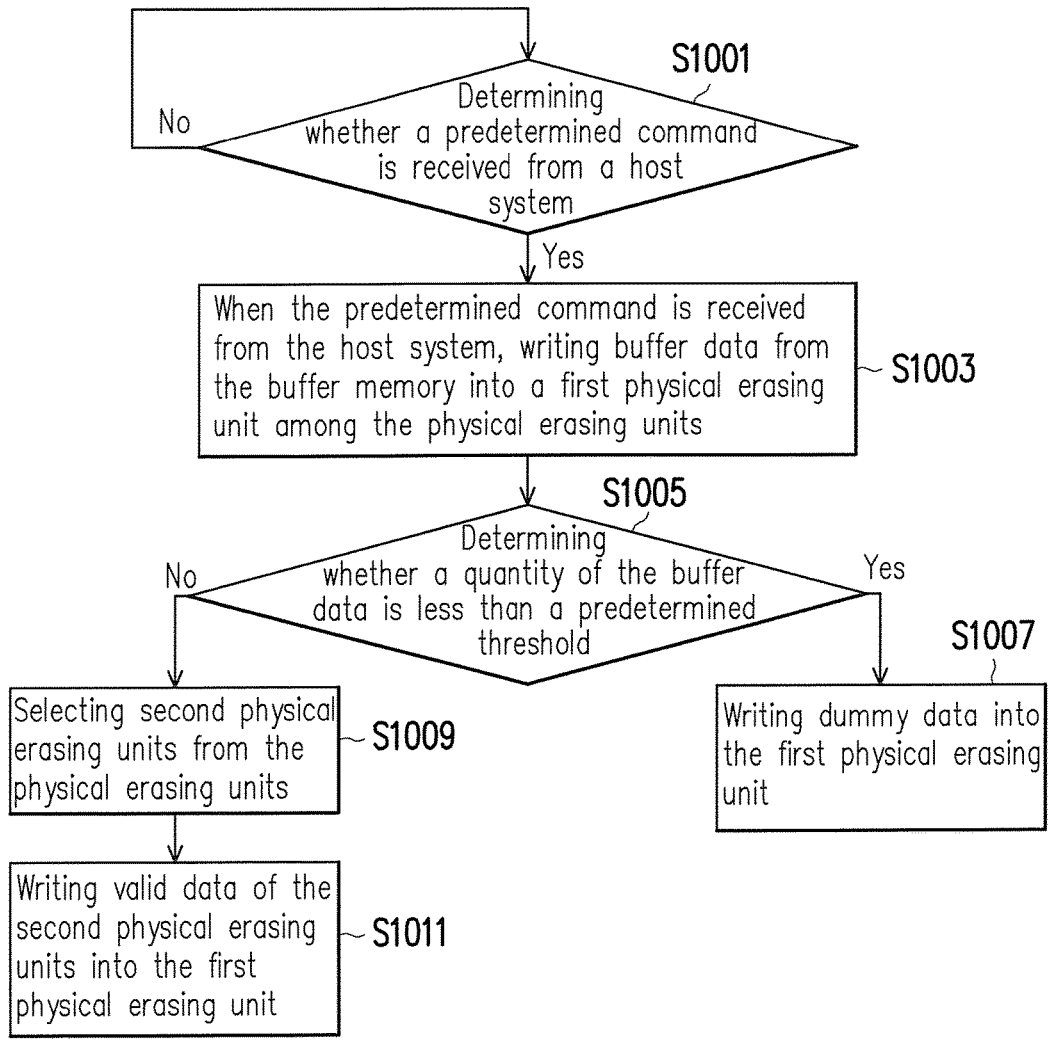
FIG. 10 is a flowchart illustrating a data writing method according to an exemplary embodiment.

FIG. 10 is a flowchart illustrating a data writing method according to an exemplary embodiment.

With reference to FIG. 10, in step S1001, the memory control circuit unit 404 (or the memory management circuit 502) determines whether a predetermined command is received from the host system 11. When the memory control circuit unit 404 (or the memory management circuit 502) does not receive the predetermined command from the host system 11, step S1001 is repeated. When the memory control circuit unit 404 (or the memory management circuit 502) receives the predetermined command from the host system 11, in step S1003, the memory control circuit unit 404 (or the memory management circuit 502) issues a command sequence to write buffer data from the buffer memory 508 into a first physical erasing unit among the physical erasing units 410(0) to 410(N) of the rewritable non-volatile memory module 406. Thereafter, in step S1005, the memory control circuit unit 404 (or the memory management circuit 502) determines whether a quantity of the buffer data is less than a predetermined threshold. When the memory control circuit unit 404 (or the memory management circuit 502) determines that the quantity of the buffer data is less than the predetermined threshold, in step S1007, the memory control circuit unit 404 (or the memory management circuit 502) issues a command sequence to write dummy data into the first physical erasing unit. If the memory control circuit unit 404 (or the memory management circuit 502) determines the quantity of the buffer data is less than the predetermined threshold, in step S1009, the memory control circuit unit 404 (or the memory management circuit 502) selects second physical erasing units from the physical erasing units 410(0) to 410(N) of the rewritable non-volatile memory module 406. And, in step S1011, the memory control circuit unit 404 (or the memory management circuit 502) issues a command sequence to write valid data of the second physical erasing units into the first physical erasing unit.

To summarize, in the data writing method of the present invention, if the predetermined command issued by the host system is received, the buffer data is stored from the buffer memory into the first physical erasing unit in the rewritable non-volatile memory module, and the valid data of the second physical erasing unit is written into the first physical erasing unit. Thereby, the use efficiency of the rewritable non-volatile memory module can be effectively improved to prevent too much invalid data from being stored, and the lifespan of the rewritable non-volatile memory module can be extended. The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data writing method for a rewritable non-volatile memory module of a memory storage apparatus, wherein the memory storage apparatus has a buffer memory, the rewritable non-volatile memory module has a plurality of physical erasing units, and each of the physical erasing units has a plurality of physical programming units, the data writing method comprising:

determining whether a predetermined command is received from a host system;

if the predetermined command is received from the host system, writing at least one buffer data from the buffer memory into a first physical erasing unit among the physical erasing units, selecting at least one second physical erasing unit from the physical erasing units, and writing at least one valid data of the at least one second physical erasing unit into the first physical erasing unit;

determining whether a quantity of the at least one buffer data is less than a predetermined threshold;

if the quantity of the at least one buffer data is less than the predetermined threshold, writing at least one dummy data into the first physical erasing unit; and only if the quantity of the at least one buffer data is not less than the predetermined threshold, performing the step of selecting the at least one second physical erasing unit from the physical erasing units and writing the at least one valid data of the at least one second physical erasing unit into the first physical erasing unit, wherein a number of bits stored in each first memory cell of the at least one first physical erasing unit equals to a number of bits stored in each second memory cell of the at least one second physical erasing unit.

2. The data writing method according to claim 1, wherein the step of writing the at least one valid data of the at least one second physical erasing unit into the first physical erasing unit comprises:

filling available storage spaces of the first physical erasing unit with the at least one valid data.

3. The data writing method according to claim 1, wherein the predetermined command is a flush command or a suspend command.

4. The data writing method according to claim 1, further comprising:

performing an erasing operation on the at least one second physical erasing unit.

5. The data writing method according to claim 1, wherein the plurality of physical programming units comprise a plurality of lower physical programming units, a plurality of center physical programming units and a plurality of upper physical programming units.

6. A memory control circuit unit for controlling a rewritable non-volatile memory module, the memory control circuit unit comprising:

a host interface configured to be coupled to a host system;

a memory interface configured to be coupled to the rewritable non-volatile memory module, wherein the rewritable non-volatile memory module has a plurality of physical erasing units, and each of the physical erasing units has a plurality of physical programming units;

a buffer memory coupled to the host interface and the memory interface and configured to store at least one buffer data; and a memory management circuit coupled to the host interface, the memory interface and the buffer memory and configured to determine whether a predetermined command is received from the host system, wherein if the predetermined command is received from the host system, the memory management circuit is further configured to issue a first command sequence to write the at least one buffer data from the buffer memory into a first physical erasing unit among the physical erasing units, select at least one second physical erasing unit from the physical erasing units, and issue a second command sequence to write at least one valid data of the at least one second physical erasing unit into the first physical erasing unit, wherein the memory management circuit is further configured to determine whether a quantity of the at least one buffer data is less than a predetermined threshold, if the quantity of the at least one buffer data is less than the predetermined threshold, the memory management circuit is further configured to issue a third command sequence to write at least one dummy data into the first physical erasing unit, only if the quantity of the at least one buffer data is not less than the predetermined threshold, the memory management circuit is configured to perform the operation of selecting the at least one second physical erasing unit from the physical erasing units and issuing the second command sequence to write the at least one valid data of the at least one second physical erasing unit into the first physical erasing unit, wherein a number of bits stored in each first memory cell of the at least one first physical erasing unit equals to a number of bits stored in each second memory cell of the at least one second physical erasing unit.

7. The memory control circuit unit according to claim 6, wherein in the operation of writing the at least one valid data of the at least one second physical erasing unit into the first physical erasing unit, the memory management circuit fills available storage spaces of the first physical erasing unit with the at least one valid data.

8. The memory control circuit unit according to claim 6, wherein the predetermined command is a flush command or a suspend command.

9. The memory control circuit unit according to claim 6, wherein the memory management circuit is further configured to issue a fourth command sequence to perform an erasing operation on the at least one second physical erasing unit.

10. The memory control circuit unit according to claim 6, wherein the plurality of physical programming units comprise a plurality of lower physical programming units, a plurality of center physical programming units and a plurality of upper physical programming units.

11. A memory storage apparatus, comprising:

a connection interface unit configured to be coupled to a host system;

a rewritable non-volatile memory module having a plurality of physical erasing units, wherein each of the physical erasing units has a plurality of physical programming units; and a memory control circuit unit coupled to the connection interface unit and the rewritable non-volatile memory module and comprising a buffer memory, wherein the buffer memory is configured to store at least one buffer data, wherein the memory control circuit unit is configured to determine whether a predetermined command is received from the host system, wherein if the predetermined command is received from the host system, the memory control circuit unit is further configured to issue a first command sequence to write the at least one buffer data from the buffer memory into a first physical erasing unit among the physical erasing units, select at least one second physical erasing unit from the physical erasing units, and issue a second command sequence to write at least one valid data of the at least one second physical erasing unit into the first physical erasing unit, wherein the memory control circuit unit is further configured to determine whether a quantity of the at least one buffer data is less than a predetermined threshold, if the quantity of the at least one buffer data is less than the predetermined threshold, the memory control circuit unit is further configured to issue a third command sequence to write at least one dummy data into the first physical erasing unit, only if the quantity of the at least one buffer data is not less than the predetermined threshold, the memory control circuit unit is configured to perform the operation of selecting the at least one second physical erasing unit from the physical erasing units and issuing the second command sequence to write the at least one valid data of the at least one second physical erasing unit into the first physical erasing unit, wherein a number of bits stored in each first memory cell of the at least one first physical erasing unit equals to a number of bits stored in each second memory cell of the at least one second physical erasing unit.

12. The memory storage apparatus according to claim 11, wherein in the operation of writing the at least one valid data of the at least one second physical erasing unit into the first physical erasing unit, the memory control circuit unit fills available storage spaces of the first physical erasing unit with the at least one valid data.

13. The memory storage apparatus according to claim 11, wherein the predetermined command is a flush command or a suspend command.

14. The memory storage apparatus according to claim 11, wherein the memory control circuit unit is further configured to issue a fourth command sequence to perform an erasing operation on the at least one second physical erasing unit.

15. The memory storage apparatus according to claim 11, wherein the plurality of physical programming units comprise a plurality of lower physical programming units, a plurality of center physical programming units and a plurality of upper physical programming units.

* * * * *